United States Patent
Ohbatake et al.

(10) Patent No.: US 11,939,744 B2
(45) Date of Patent: Mar. 26, 2024

(54) DISPLAY SYSTEM, REMOTE OPERATION SYSTEM, AND DISPLAY METHOD

(71) Applicants: Komatsu Ltd., Tokyo (JP); Osaka University, Suita (JP)

(72) Inventors: Youjirou Ohbatake, Tokyo (JP); Taro Maeda, Suita (JP); Masahiro Furukawa, Suita (JP); Daisuke Kondo, Suita (JP); Masataka Kurokawa, Suita (JP)

(73) Assignees: Komatsu Ltd., Tokyo (JP); Osaka University, Suita (JP)

( * ) Notice: Subject to any disclaimer, the term of this patent is extended or adjusted under 35 U.S.C. 154(b) by 47 days.

(21) Appl. No.: 17/629,496

(22) PCT Filed: Jul. 22, 2020

(86) PCT No.: PCT/JP2020/028501
§ 371 (c)(1),
(2) Date: Jan. 24, 2022

(87) PCT Pub. No.: WO2021/020292
PCT Pub. Date: Feb. 4, 2021

(65) Prior Publication Data
US 2022/0290401 A1 Sep. 15, 2022

(30) Foreign Application Priority Data
Jul. 26, 2019 (JP) .................. 2019-138122

(51) Int. Cl.
*G06F 3/01* (2006.01)
*E02F 9/20* (2006.01)
(Continued)

(52) U.S. Cl.
CPC .............. *E02F 9/205* (2013.01); *G06F 3/013* (2013.01); *G09G 5/377* (2013.01);
(Continued)

(58) Field of Classification Search
CPC .......... E02F 9/205; E02F 9/261; G06F 3/013; G06F 3/012; H04N 9/3182; H04N 9/3194;
(Continued)

(56) References Cited

U.S. PATENT DOCUMENTS 10,152,120 B2 12/2018 Saisho
10,233,615 B2 * 3/2019 Yamaguchi ............... G06T 7/97
(Continued)

FOREIGN PATENT DOCUMENTS

JP H06-339153 A 12/1994
JP H08-107516 A 4/1996
(Continued)

OTHER PUBLICATIONS

Q. H. Le et al., "A Study on Remote Control System Integrated Intuitive Vision System for Field Robot Using Head Tracker System," 2014 14th International Conference on Control, Automation and Systems (ICCAS 2014), 2014, pp. 326-330. (cited in the Dec. 19, 2022 Office Action issued for AU2020322381).
(Continued)

*Primary Examiner* — Mihir K Rayan
(74) *Attorney, Agent, or Firm* — Locke Lord LLP

(57) ABSTRACT

A display system includes: an image acquisition unit that acquires each of a first image of a work site imaged by a first camera and a second image of the work site imaged by a second camera; a viewpoint position calculation unit that calculates a viewpoint position of worker; a luminance adjustment unit that adjusts luminance of at least one of the first image and the second image based on the viewpoint position; and a display control unit that combines the first image and the second image having the luminance adjusted and causes a display device to display the combined image.

10 Claims, 10 Drawing Sheets

(51) Int. Cl.
*G09G 5/10* (2006.01)
*G09G 5/377* (2006.01)
*H04N 9/31* (2006.01)

(52) U.S. Cl.
CPC .......... *H04N 9/3182* (2013.01); *H04N 9/3194* (2013.01); *G06F 3/012* (2013.01); *G09G 5/10* (2013.01)

(58) Field of Classification Search
CPC .......... H04N 23/90; H04N 7/18; H04N 23/60; G09G 5/00; G09G 5/10; G09G 5/36; G09G 5/377
See application file for complete search history.

(56) References Cited

U.S. PATENT DOCUMENTS

| | | | |
|---|---|---|---|
| 10,829,910 | B2 | 11/2020 | Yoshinada et al. |
| 11,431,917 | B2 * | 8/2022 | Siddiqui ............... G09G 3/3426 |
| 2009/0040297 | A1 * | 2/2009 | Harada ................ G09G 3/3648 348/54 |
| 2009/0079818 | A1 * | 3/2009 | Saishu ................... G03B 35/00 348/51 |
| 2009/0141121 | A1 * | 6/2009 | Kimpe ................ H04N 13/327 348/E13.001 |
| 2018/0051446 | A1 * | 2/2018 | Yoshinada ............. E02F 9/264 |
| 2018/0339591 | A1 | 11/2018 | Suzuki et al. |
| 2019/0082168 | A1 * | 3/2019 | Lee ........................ H04N 13/31 |
| 2019/0330825 | A1 | 10/2019 | Tanimoto et al. |
| 2019/0387219 | A1 * | 12/2019 | Kondo .................... G06T 19/00 |
| 2020/0018049 | A1 | 1/2020 | Takahama et al. |
| 2020/0063397 | A1 | 2/2020 | Hatake et al. |
| 2021/0285184 | A1 | 9/2021 | Tanimoto et al. |

FOREIGN PATENT DOCUMENTS

| | | |
|---|---|---|
| JP | 2016-107945 A | 6/2016 |
| WO | 2016/013691 A1 | 1/2016 |
| WO | 2016/140055 A1 | 9/2016 |
| WO | 2017/138409 A1 | 8/2017 |
| WO | 2018/043299 A1 | 3/2018 |
| WO | 2018/043301 A1 | 3/2018 |
| WO | 2018/168163 A1 | 9/2018 |
| WO | 2018/220914 A1 | 12/2018 |
| WO | 2019/054000 A1 | 3/2019 |

OTHER PUBLICATIONS

Office Action dated Dec. 19, 2022, issued in the corresponding AU patent application No. 2020322381.

* cited by examiner

<REMOTE OPERATION FACILITY>

DISPLAY SYSTEM, REMOTE OPERATION SYSTEM, AND DISPLAY METHOD

FIELD

The present disclosure relates to a display system, a remote operation system, and a display method.

BACKGROUND

As one of methods for making a work machine unmanned, a method for remotely operating a work machine has been proposed. When the work machine is remotely operated, an image of the work site is sent to a display device present at a remote place. The worker remotely operates the work machine while checking the image of the work site displayed on the display device. Patent Literature 1 discloses a teleoperating system including a TV camera that images a work site, a head position detection sensor that detects a position of a head of a worker, an actuator that controls an orientation of the TV camera in a manner that an imaging direction of the TV camera corresponds to a detection result of the head position detection sensor, and a projector that generates an image light wave from an imaging signal and projects the image light wave onto a screen.

CITATION LIST

Patent Literature

Patent Literature 1: JP 06-339153 A

SUMMARY

Technical Problem

When the two-dimensional image of the work site is displayed on the display device, it is difficult for the worker to perceive the perspective of the work site. As a result, the worker cannot smoothly perform the remote operation, and the work efficiency of the work machine may be lowered. A detection signal of the head position detection sensor is sent from a remote place to the actuator at the work site, the actuator is driven in a manner that the camera moves in conjunction with the head of the worker, and an image acquired by the camera is sent from the work site to the display device at the remote place. Thus, the viewpoint of the image displayed on the display device moves in conjunction with the head of the worker. As a result, the motion parallax associated with the movement of the viewpoint is presented to the worker, and the worker can perceive the perspective by the motion stereoscopic vision and can smoothly perform the remote operation easily.

However, there is a possibility that the movement of the viewpoint of the image displayed on the display device is delayed with respect to the movement of the head of the worker due to a communication delay of the detection signal sent from the remote place to the work site or a communication delay of the image sent from the work site to the remote place. As a result, it is difficult to present the motion parallax correctly corresponding to the viewpoint, and it is difficult for the worker to perceive the perspective due to the motion stereoscopic vision.

On the other hand, since images from a large number of cameras corresponding to a large number of viewpoints are sent to a display device at a remote place, there is a high possibility that the worker can perceive the perspective, but it is difficult to secure a line capacity for sending a large-capacity images from a large number of cameras.

An object of the present disclosure is to allow a worker who remotely operates a work machine to effectively perceive the perspective of a work site even with a limited line capacity.

Solution to Problem

According to an aspect of the present invention, a display system comprises: an image acquisition unit that acquires each of a first image of a work site imaged by a first imaging device and a second image of the work site imaged by a second imaging device; a viewpoint position calculation unit that calculates a viewpoint position of a worker; a luminance adjustment unit that adjusts luminance of at least one of the first image and the second image based on the viewpoint position; and a display control unit that combines the first image and the second image having the luminance adjusted and causes a display device to display the combined image.

Advantageous Effects of Invention

According to the present disclosure, a worker who remotely operates a work machine can effectively perceive the perspective of a work site even with a limited line capacity.

DESCRIPTION OF EMBODIMENTS

Hereinafter, embodiments according to the present disclosure will be described with reference to the drawings, but the present disclosure is not limited to this. The components of the embodiments described below can be appropriately combined. In addition, some components may not be used.

[Remote Operation System]

Figure 1:
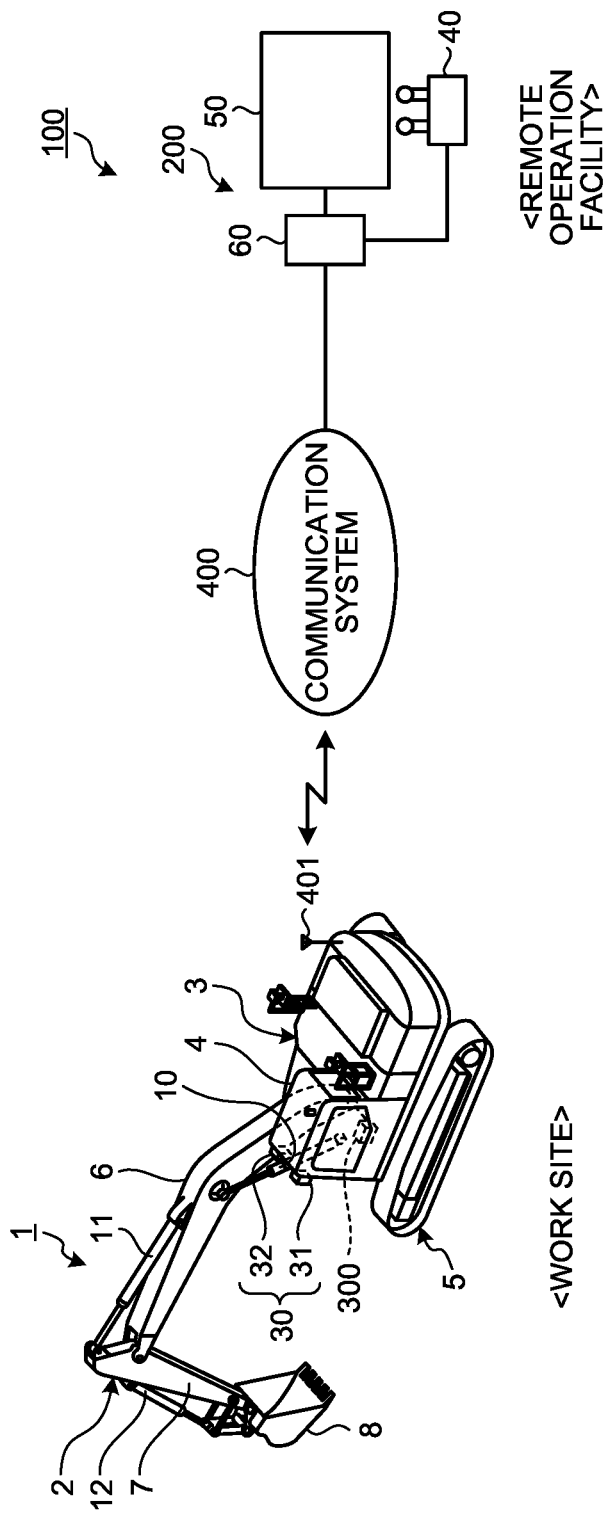
FIG. 1 is a diagram schematically illustrating a remote operation system of a work machine according to the present embodiment.
Figure 2:
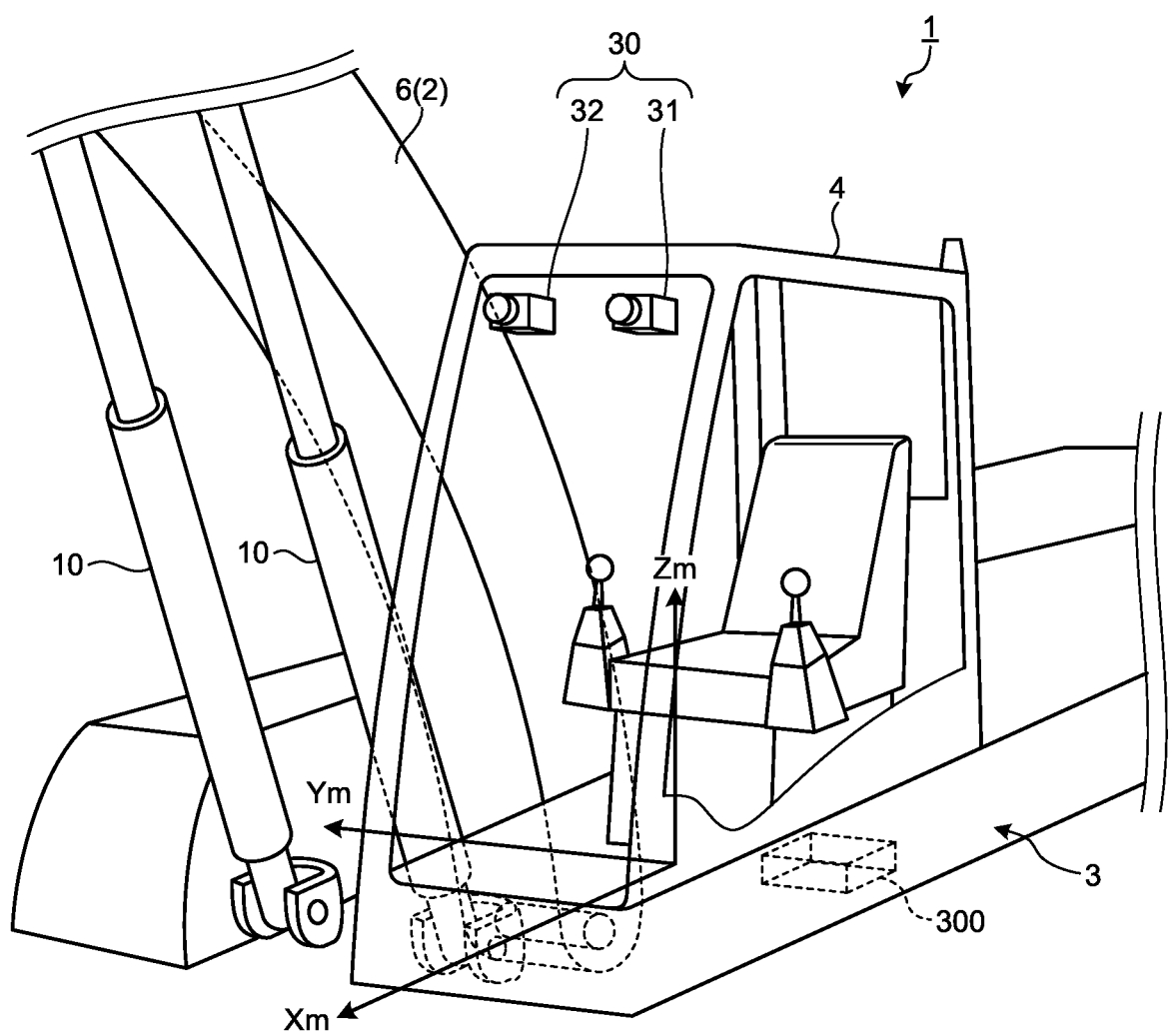
FIG. 2 is a diagram schematically illustrating a part of the work machine according to the present embodiment.

FIG. 1 is a diagram schematically illustrating a remote operation system 100 of a work machine 1 according to the present embodiment. FIG. 2 is a diagram schematically illustrating a part of the work machine 1 according to the present embodiment. In the present embodiment, the work machine 1 is an excavator. In the following description, the work machine 1 is appropriately referred to as an excavator 1.

The excavator 1 works at a work site. The excavator 1 includes a working equipment 2, a swing body 3 including a cab 4, a traveling body 5 that swingably supports the swing body 3, and a control device 300.

The working equipment 2 includes a boom 6 connected to the swing body 3, an arm 7 connected to the boom 6, a bucket 8 connected to the arm 7, a boom cylinder 10 that drives the boom 6, an arm cylinder 11 that drives the arm 7, and a bucket cylinder 12 that drives the bucket 8. Each of the boom cylinder 10, the arm cylinder 11, and the bucket cylinder 12 is a hydraulic cylinder driven by hydraulic pressure.

The traveling body 5 includes a crawler belt. When the crawler belt rotates, the excavator 1 travels.

The control device 300 outputs a control signal for controlling the excavator 1. The control device 300 includes a computer system.

The remote operation system 100 includes an imaging device 30 that images a work site, a display system 200 that displays an image related to the work site in a remote operation facility, and a remote operation device 40 provided in the remote operation facility. The remote operation facility is provided at a remote place of the work site.

The imaging device 30 is provided in the excavator 1. The imaging device 30 only needs to be installed at a position where an object can be imaged, and may be installed at a position other than the cab. In a cabless vehicle without a driver's cab, the imaging device 30 may install a camera at a position where an object can be imaged. The imaging device 30 includes a first camera 31 and a second camera 32. Each of the first camera 31 and the second camera 32 is a video camera and images the work site. The first camera 31 and the second camera 32 may be stereo cameras. Each of the first camera 31 and the second camera 32 includes an optical system and an image sensor that receives light passing through the optical system. The image sensor includes a couple charged device (CCD) image sensor or a complementary metal oxide semiconductor (CMOS) image sensor.

As illustrated in FIG. 2, each of the first camera 31 and the second camera 32 is fixed to the cab 4 of the swing body 3.

A three-dimensional vehicle body coordinate system (Xm, Ym, Zm) is defined in the swing body 3. The Xm-axis direction is the front-rear direction of the swing body 3. The Ym-axis direction is the vehicle width direction of the swing body 3. The Zm-axis direction is the vertical direction of the swing body 3. The first camera 31 and the second camera 32 are disposed in a predetermined direction of the swing body 3. The first camera 31 and the second camera 32 are disposed in the vehicle width direction (Ym-axis direction) of the swing body 3. The first camera 31 and the second camera 32 may be disposed in the vertical direction (Zm-axis direction) that is the height direction of the swing body 3 or the front-rear direction (Xm-axis direction) that is the visual axis direction. The visual field of the optical system of the first camera 31 and at least a part of the visual field of the optical system of the second camera 32 overlap.

Each of the first camera 31 and the second camera 32 images an object at a work site present in front of the swing body 3.

The object imaged by the imaging device 30 includes a construction object constructed in a work site. The construction object includes an excavation object excavated by the working equipment 2 of the excavator 1. Note that the construction object may be a construction object constructed by a work machine different from the excavator 1, or may be a construction object constructed by a worker. In addition, the construction object is a concept including a construction object before construction, a construction object under construction, and a construction object after construction.

In addition, the object imaged by the imaging device 30 includes at least a part of the excavator 1. The object imaged by the imaging device 30 includes, for example, at least one of the working equipment 2, the swing body 3, and the traveling body 5. The working equipment 2 that is an object may be the working equipment 2 in an excavating state or the working equipment 2 in a non-excavating state. The swing body 3 that is an object may be the swing body 3 in a swinging state or the swing body 3 in a non-swinging state. The traveling body 5 that is an object may be the traveling body 5 in a traveling state or the traveling body 5 in a non-traveling state. In addition, the object imaged by the imaging device 30 may be a work machine disposed around the excavator 1 that is remotely operated. The object imaged by the imaging device 30 may be an excavator different from the excavator 1 that is remotely operated, or may be a dump truck.

In the following description, the image of the work site imaged by the first camera 31 will be appropriately referred to as a first image M1, and the image of the work site imaged by the second camera 32 will be appropriately referred to as a second image M2.

The display system 200 includes a display device 50 disposed outside the excavator 1 and a processing device 60 disposed outside the excavator 1. The display system 200 may further include the imaging device 30. Each of the display device 50 and the processing device 60 is a body separate from the excavator 1. Each of the display device 50 and the processing device 60 is provided, for example, in a remote operation facility.

As the display device 50, a flat panel display such as a liquid crystal display (LCD) or an organic electroluminescence display (OELD) is exemplified. The processing device 60 includes a computer system.

The remote operation device 40 is disposed outside the excavator 1. The remote operation device 40 is a body separate from the excavator 1. The remote operation device 40 includes a working lever that remotely operates the working equipment 2 and the swing body 3 of the excavator 1 and a traveling lever that remotely operates the traveling body 5. The worker operates the remote operation device 40 in the remote operation facility.

The processing device 60 can communicate with the control device 300 of the excavator 1 via a communication system 400. The communication system 400 includes a wireless communication device 401 mounted on the excavator 1. The communication system 400 includes at least one of the Internet, a local area network (LAN), a mobile phone communication network, and a satellite communication network.

An operation signal generated by operating the remote operation device 40 is sent to the control device 300 via the communication system 400. The control device 300 outputs a control signal for controlling the working equipment 2, the swing body 3, and the traveling body 5 based on the acquired operation signal. As a result, the excavator 1 is remotely operated.

Each of the first image M1 of the work site imaged by the first camera 31 and the second image M2 of the work site imaged by the second camera 32 is sent to the processing device 60 via the communication system 400. The processing device 60 performs image processing of the first image M1 and the second image M2, and causes the display device 50 to display a predetermined image.

[Remote Operation Facility]

Figure 3:
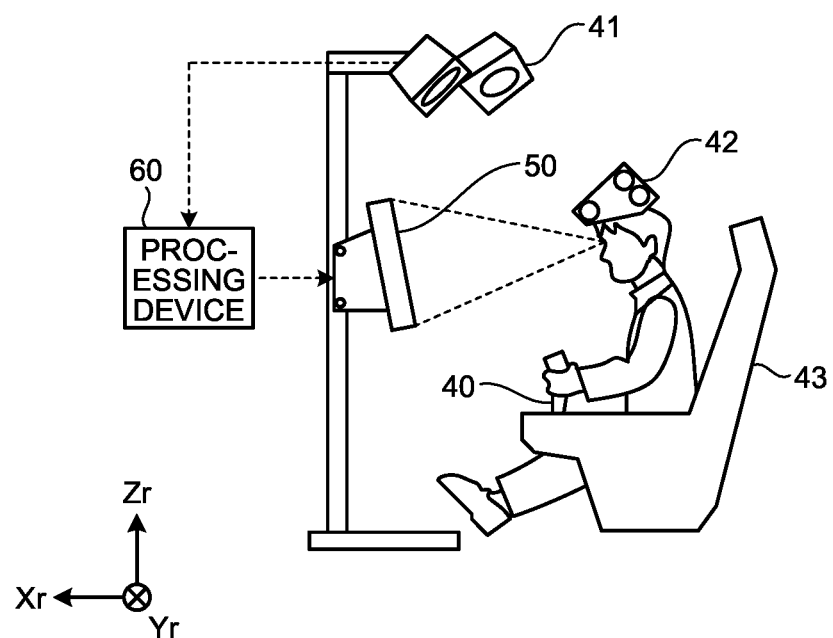
FIG. 3 is a diagram schematically illustrating a remote operation facility according to the present embodiment.

FIG. 3 is a diagram schematically illustrating a remote operation facility according to the present embodiment. As illustrated in FIG. 3, the remote operation system 100 includes a head position sensor 41 that detects the position and posture of the head of the worker, a cap 42 attached to the head of the worker, a cockpit 43 on which the worker sits, the remote operation device 40, the display device 50, and the processing device 60. Each of the head position sensor 41, the cap 42, the cockpit 43, the remote operation device 40, the display device 50, and the processing device 60 is provided, for example, in a remote operation facility outside the excavator 1.

The head position sensor 41 detects the position and posture of the head of the worker. The cap 42 is attached to the head of the worker. The cap 42 is provided with a head marker. The head position sensor 41 optically detects the head marker of the cap 42 and detects the position and posture of the head of the worker.

The head position sensor 41 functions as a viewpoint position sensor that detects the viewpoint position of the worker outside the excavator 1. The viewpoint position is subserviently determined from the position and posture of the head. The relative position between the head and the viewpoint is known data. Therefore, by detecting the position and posture of the head of the worker, the viewpoint position of the worker is detected.

The worker sits on the cockpit 43 to face the display screen of the display device 50. The worker operates the remote operation device 40 while checking the display screen of the display device 50. The head position sensor 41 detects the position and posture of the head of the worker sitting on the cockpit.

A three-dimensional local coordinate system (Xr, Yr, Zr) is defined in the head position sensor 41. When the position of the vehicle body coordinate system is transformed into the position of the local coordinate system by a prescribed transformation formula or transformation matrix, the position in the Xm-axis direction is transformed into the position in the Xr-axis direction, the position in the Ym-axis direction is transformed into the position in the Yr-axis direction, and the position in the Zm-axis direction is transformed into the position in the Zr-axis direction. That is, the Xr-axis of the local coordinate system corresponds to the Xm-axis of the vehicle body coordinate system, and similarly, the Yr-axis corresponds to the Ym-axis, and the Zr-axis corresponds to the Zm-axis. The Xr-axis direction is the front-rear direction of the worker sitting on the cockpit 43. The Yr-axis direction is the left-right direction of the worker sitting on the cockpit 43. The Zr-axis direction is the vertical direction of the worker sitting on the cockpit 43. The Yr-axis direction corresponds to the lateral direction of the display screen of the display device 50.

[Display System]

Figure 4:
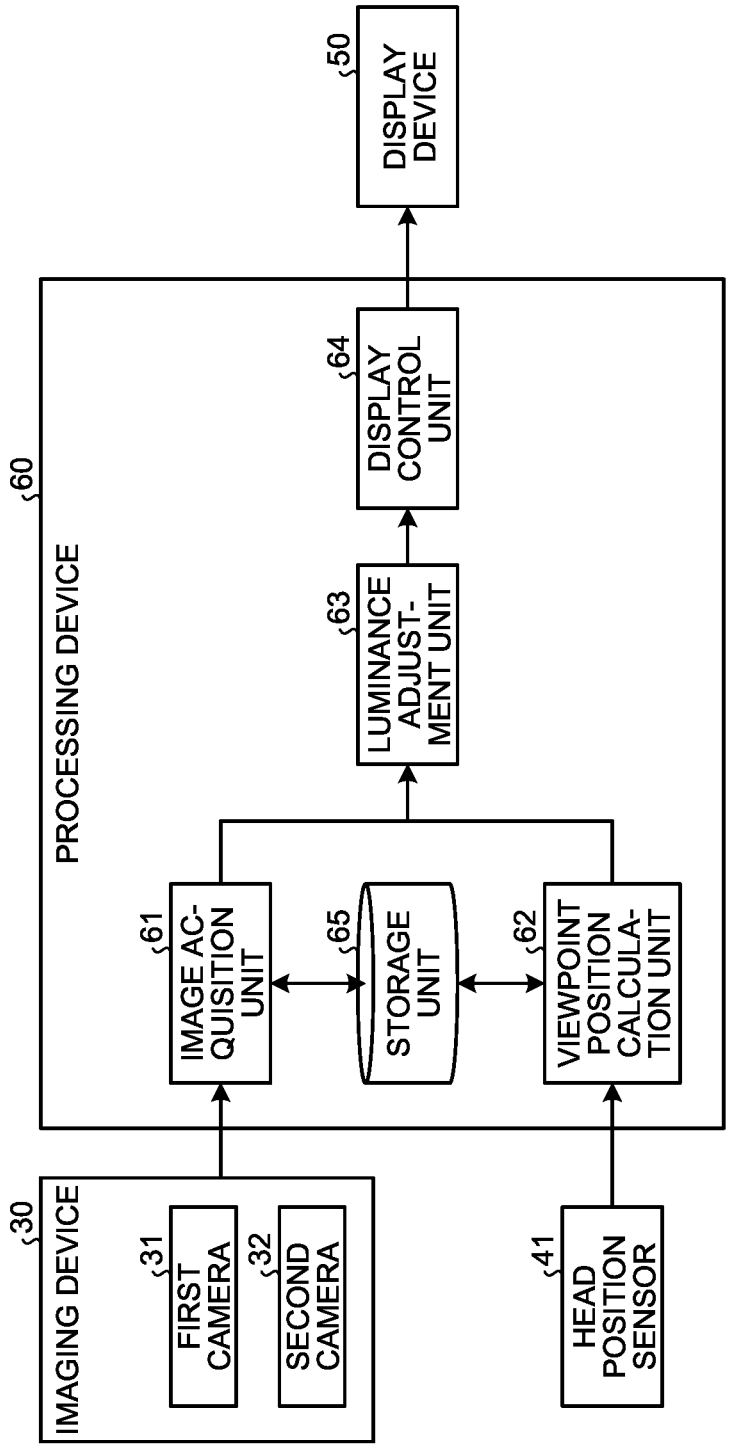
FIG. 4 is a functional block diagram illustrating a display system according to the present embodiment.

FIG. 4 is a functional block diagram illustrating the display system 200 according to the present embodiment. As illustrated in FIG. 4, the display system 200 includes the head position sensor 41, the display device 50, and the processing device 60.

The first camera 31 of the imaging device 30 images the work site and acquires the first image M1 of the work site. The second camera 32 of the imaging device 30 images the work site and acquires the second image M2 of the work site. The first image M1 acquired by the first camera 31 and the second image M2 acquired by the second camera 32 are sent to the processing device 60 via the communication system 400. The detection data of the head position sensor 41 is output to the processing device 60.

The processing device 60 includes an image acquisition unit 61, a viewpoint position calculation unit 62, a luminance adjustment unit 63, a display control unit 64, and a storage unit 65.

The image acquisition unit 61 acquires each of the first image M1 of the work site imaged by the first camera 31 and the second image M2 of the work site imaged by the second camera 32 via the communication system 400.

The viewpoint position calculation unit 62 calculates the viewpoint position of the worker based on the detection data of the head position sensor 41. The head position sensor 41 sequentially acquires the position and posture of the head of the worker. The viewpoint position of the worker sequentially changes. The viewpoint position is subserviently determined from the position and posture of the head. The relative position between the head and the viewpoint is known data and is stored in the storage unit 65. The viewpoint position calculation unit 62 can calculate the viewpoint position of the worker based on the detection data of the head position sensor 41 and the known data stored in the storage unit 65.

The luminance adjustment unit 63 adjusts the luminance of at least one of the first image M1 and the second image M2 based on the viewpoint position of the worker calculated by the viewpoint position calculation unit 62.

Figure 5:
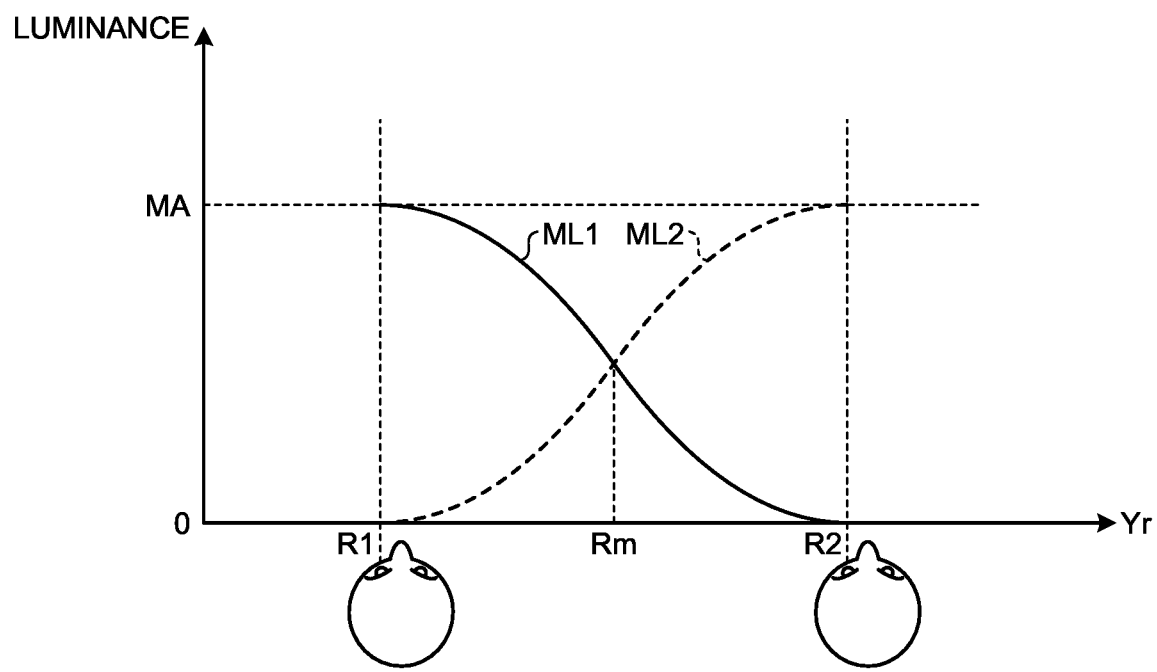
FIG. 5 is a diagram for describing an operation of a luminance adjustment unit according to the present embodiment.

FIG. 5 is a diagram for describing an operation of the luminance adjustment unit 63 according to the present embodiment. When the worker moves the head, the viewpoint position of the worker changes.

In the present embodiment, the viewpoint position moves between a first position R1 and a second position R2. The first position R1 and the second position R2 are disposed in the Yr-axis direction corresponding to the Ym-axis direction (vehicle width direction) of the swing body 3. The Yr-axis direction corresponding to the Ym-axis direction refers to the Yr-axis direction after the transformation of the Ym-axis direction when the vehicle body coordinate system is transformed into the local coordinate system by a prescribed transformation formula or transformation matrix. As described above, the Yr-axis direction is the left-right direction of the worker sitting on the cockpit 43, and corresponds to the lateral direction of the display screen of the display device 50. Note that a plurality of cameras such as a third camera and a fourth camera may be further installed in the Xm-axis direction corresponding to the head motion in the Xr-axis direction to establish similar transformation.

As illustrated in FIG. 2, the second camera 32 is disposed on the +Ym side with respect to the first camera 31. As illustrated in FIG. 5, the second position R2 is disposed on the +Yr side with respect to the first position R1. The relative position between the first camera 31 and the second camera 32 in the vehicle body coordinate system coincides with the relative position between the first position R1 and the second position R2 in the local coordinate system.

For example, the position of the first camera 31 in the vehicle body coordinate system is transformed into the first position R1 in the local coordinate system. The position of the second camera 32 in the vehicle body coordinate system is transformed into the second position R2 in the local coordinate system. Note that the relative position between the first camera 31 and the second camera 32 in the vehicle body coordinate system only needs to coincide with the relative position between the first position R1 and the second position R2 in the local coordinate system, and the position of the first camera 31 may be transformed into a position different from the first position R1 or the position of the second camera 32 may be transformed into a position different from the second position R2.

In FIG. 5, a line ML1 indicates the relationship between the viewpoint position in the Yr-axis direction and a luminance L1 of the first image M1. A line ML2 indicates a relationship between the viewpoint position in the Yr-axis direction and a luminance L2 of the second image M2. As indicated by the line ML1, the luminance adjustment unit 63 adjusts the luminance L1 of the first image M1 based on the viewpoint position in the Yr-axis direction. In addition, as indicated by the line ML2, the luminance adjustment unit 63 adjusts the luminance L2 of the second image M2 based on the viewpoint position in the Yr-axis direction.

The luminance adjustment unit 63 adjusts the luminance L1 and the luminance L2 in a manner that the luminance L1 of the first image M1 becomes higher than the luminance L2 of the second image M2 when the viewpoint position is at the first position R1, and the luminance L2 of the second image M2 becomes higher than the luminance L1 of the first image M1 when the viewpoint position is at the second position R2.

The luminance adjustment unit 63 performs adjustment in a manner that the luminance L1 of the first image M1 becomes higher as the viewpoint position is closer to the first position R1, and the luminance L2 of the second image M2 becomes higher as the viewpoint position is closer to the second position R2. In addition, the luminance adjustment unit 63 adjusts the luminance L1 and the luminance L2 in a manner that the luminance L2 of the second image M2 becomes lower as the viewpoint position is closer to the first position R1, and the luminance L1 of the first image M1 becomes lower as the viewpoint position is closer to the second position R2.

That is, the luminance adjustment unit 63 adjusts the luminance L1 and the luminance L2 in a manner that the luminance L1 of the first image M1 becomes higher than the luminance L2 of the second image M2 as the viewpoint position is closer to the first position R1, and the luminance L2 of the second image M2 becomes higher than the luminance L1 of the first image M1 as the viewpoint position is closer to the second position R2.

In the present embodiment, the luminance adjustment unit 63 adjusts the luminance L1 and the luminance L2 in a manner that the luminance L1 of the first image M1 becomes higher than the luminance L2 of the second image M2 when the viewpoint position is closer to the first position R1 than a center position Rm between the first position R1 and the second position R2, and the luminance L2 of the second image M2 becomes higher than the luminance L1 of the first image M1 when the viewpoint position is closer to the second position R2 than the center position Rm.

The luminance adjustment unit 63 adjusts the luminance L1 and the luminance L2 in a manner that the luminance L1 of the first image M1 becomes a prescribed value MA and the luminance L2 of the second image M2 becomes zero when the viewpoint position is at the first position R1. The luminance adjustment unit 63 adjusts the luminance L1 and the luminance L2 in a manner that the luminance L2 of the second image M2 becomes the prescribed value MA and the luminance L1 of the first image M1 becomes zero when the viewpoint position is at the second position R2. That is, the luminance adjustment unit 63 adjusts the luminance L1 and the luminance L2 in a manner that [luminance L1:luminance L2=1:0] when the viewpoint position is at the first position R1, and in a manner that [luminance L1:luminance L2=0:1] when the viewpoint position is at the second position R2.

In addition, the luminance adjustment unit 63 adjusts the luminance L1 and the luminance L2 in a manner that the luminance L1 of the first image M1 becomes a half of the prescribed value MA and the luminance L2 of the second image M2 becomes a half of the prescribed value MA when the viewpoint position is at the center position Rm. That is, when the viewpoint position is at the center position Rm, the luminance adjustment unit 63 adjusts the luminance L1 and the luminance L2 in a manner that [luminance L1:luminance L2=1:1].

The inclination of the line ML1 is equal to the inclination of the line ML2. The inclination of the line ML1 refers to a change rate of the luminance L1 with respect to the distance from the first position R1 to the viewpoint position, and the inclination of the line ML2 refers to a change rate of the luminance L2 with respect to the distance from the second position R2 to the viewpoint position.

The display control unit 64 combines the first image M1 and the second image M2 having the luminance adjusted by the luminance adjustment unit 63, and causes the display device 50 to display the combined image.

Figure 6:
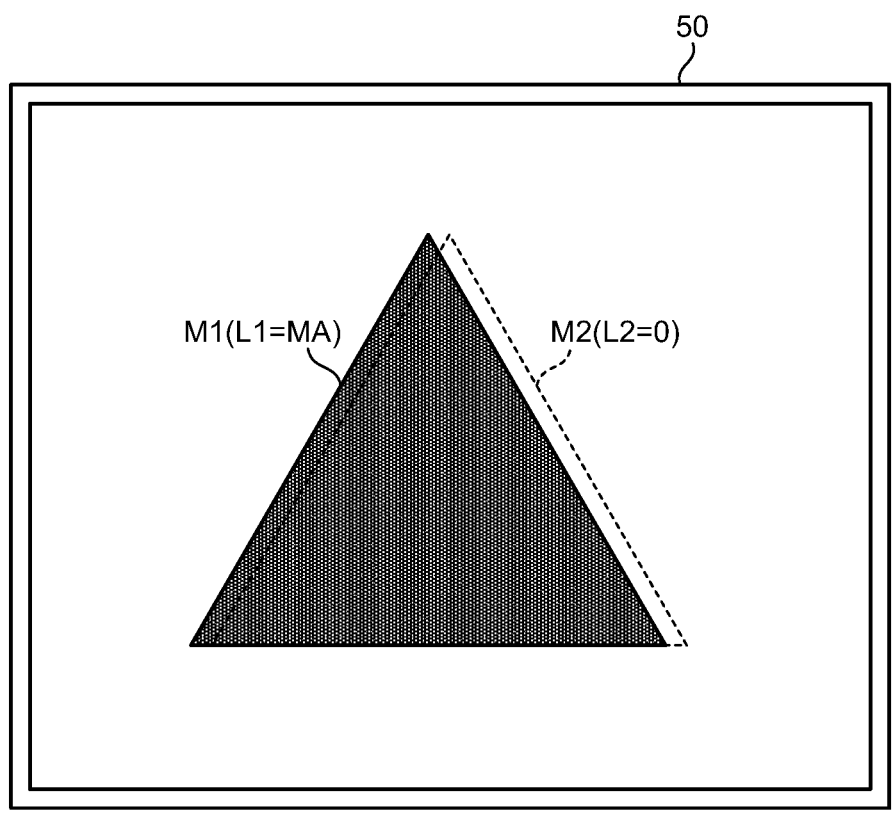
FIG. 6 is a diagram for describing an operation of a display control unit according to the present embodiment.
Figure 6:
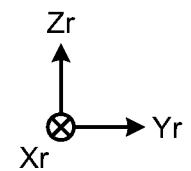
Figure 7:
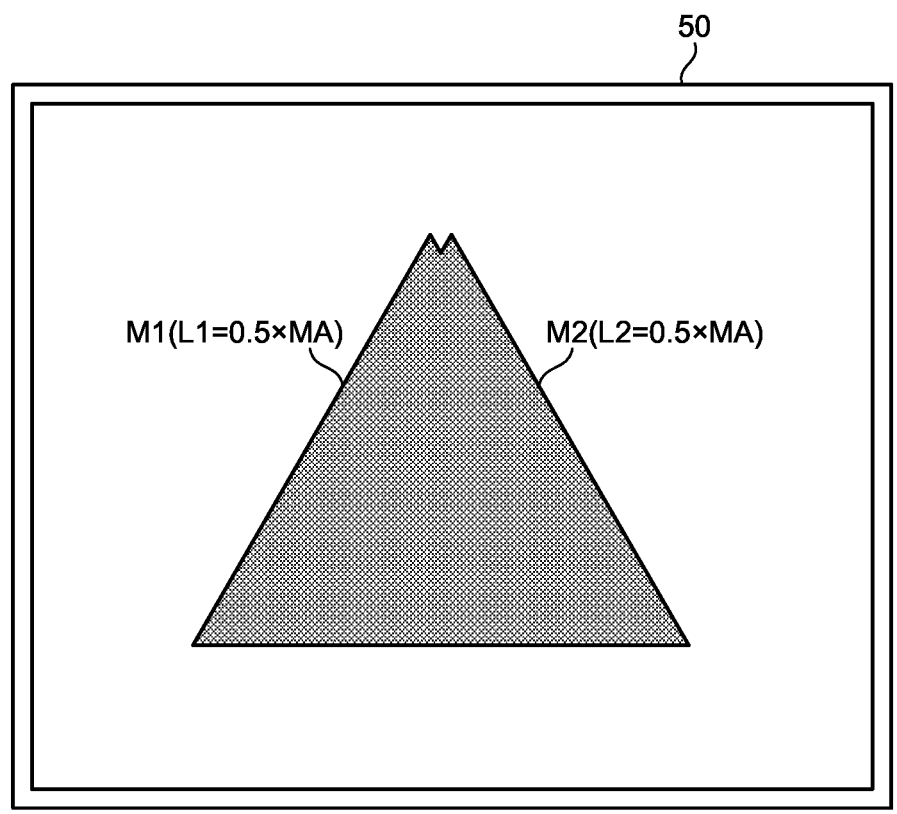
FIG. 7 is a diagram for describing an operation of the display control unit according to the present embodiment.
Figure 8:
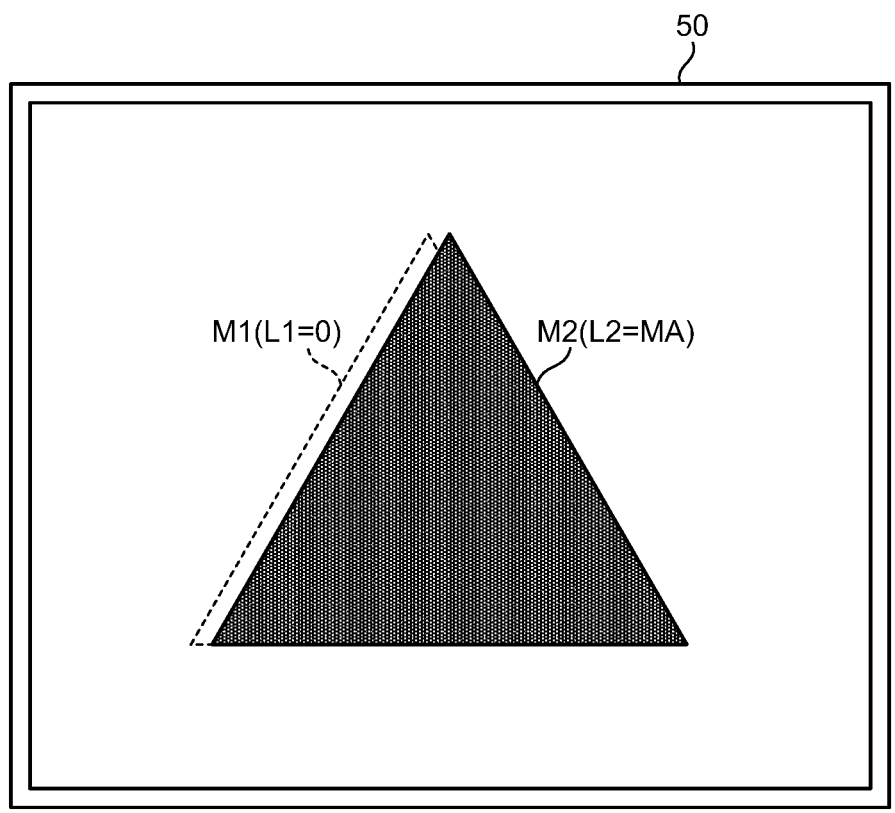
FIG. 8 is a diagram for describing an operation of the display control unit according to the present embodiment.

Each of FIGS. 6, 7, and 8 is a diagram for describing an operation of the display control unit 64 according to the present embodiment. FIG. 6 illustrates an image displayed on the display device 50 when the viewpoint position is at the first position R1. FIG. 7 illustrates an image displayed on the display device 50 when the viewpoint position is at the center position Rm. FIG. 8 illustrates an image displayed on the display device 50 when the viewpoint position is at the second position R2.

As illustrated in FIG. 6, when the viewpoint position is at the first position R1, the display control unit 64 causes the display device 50 to display only the first image M1 having the luminance L1 at the prescribed value MA.

As illustrated in FIG. 7, when the viewpoint position is at the center position Rm, the display control unit 64 causes the display device 50 to display the first image M1 having the luminance L1 of [0.5×MA] and the second image M2 having a luminance L2 of [0.5×MA] in a superimposed manner.

As illustrated in FIG. 8, when the viewpoint position is at the second position R2, the display control unit 64 causes the display device 50 to display only the second image M2 having the luminance L2 at the prescribed value MA.

[Display Method]

Figure 9:
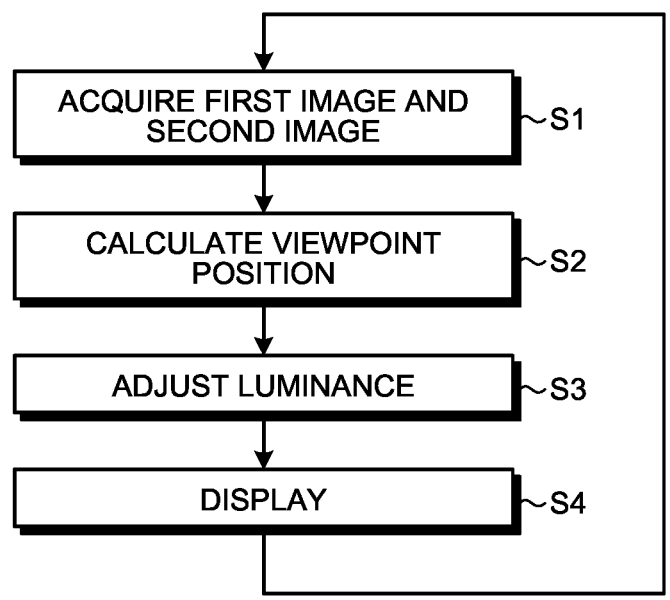
FIG. 9 is a flowchart illustrating a display method of the display system according to the present embodiment.

FIG. 9 is a flowchart illustrating a display method of the display system 200 according to the present embodiment. The first camera 31 and the second camera 32 image the work site. The control device 300 sends each of the first image M1 of the work site imaged by the first camera 31 and the second image M2 of the work site imaged by the second camera 32 to the processing device 60 via the communication system 400. The image acquisition unit 61 of the processing device 60 acquires each of the first image M1 of the work site imaged by the first camera 31 and the second image M2 of the work site imaged by the second camera 32 (Step S1).

The head position sensor 41 detects the position and posture of the head of the worker. The detection data of the head position sensor 41 is output to the viewpoint position calculation unit 62. The viewpoint position calculation unit 62 calculates the viewpoint position of the worker based on the detection data of the head position sensor 41 and the known data indicating the relative position between the head and the viewpoint stored in the storage unit 65 (Step S2).

The luminance adjustment unit 63 adjusts the luminance L1 of the first image M1 and the luminance L2 of the second image M2 based on the viewpoint position of the worker calculated by the viewpoint position calculation unit 62 (Step S3).

As described with reference to FIG. 5, the luminance adjustment unit 63 adjusts the luminance L1 and the luminance L2 in a manner that the luminance L1 of the first image M1 becomes higher than the luminance L2 of the second image M2 when the viewpoint position is at the first position R1, and the luminance L1 of the second image M2 becomes higher than the luminance L1 of the first image M1 when the viewpoint position is at the second position R2.

The display control unit 64 combines the first image M1 having the luminance L1 adjusted by the luminance adjustment unit 63 and the second image M2 having the luminance L2 adjusted, and causes the display device 50 to display the combined image (Step S4).

[Computer System]

Figure 10:
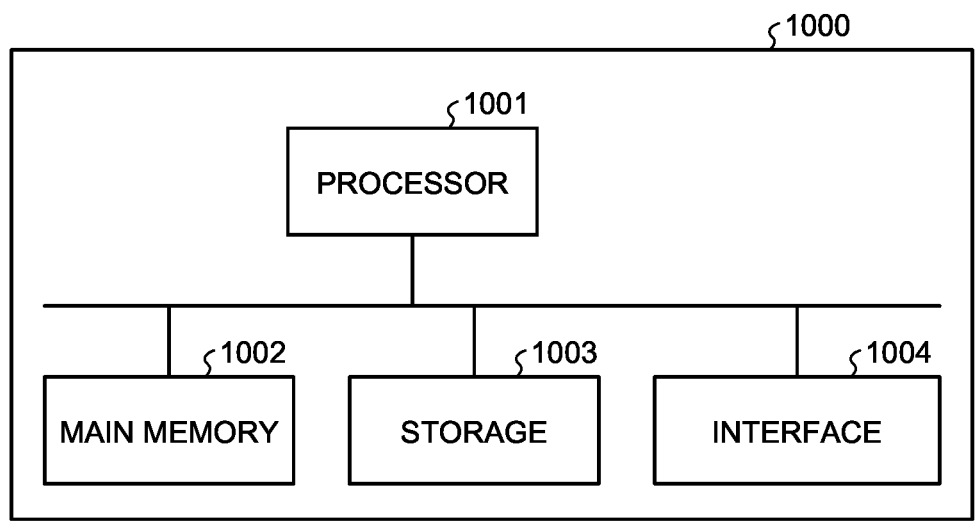
FIG. 10 is a block diagram illustrating a computer system according to the present embodiment.

FIG. 10 is a block diagram illustrating a computer system 1000 according to the present embodiment. The processing device 60 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The functions of the processing device 60 described above are stored in the storage 1003 as a computer program. The processor 1001 reads the computer program from the storage 1003, develops the computer program in the main memory 1002, and executes the above-described processing according to the computer program. Note that the computer program may be distributed to the computer system 1000 via a network.

According to the above-described embodiment, the computer program can execute: adjusting the luminance of at least one of the first image M1 of the work site imaged by the first camera 31 and the second image M2 of the work site imaged by the second camera 32 based on the viewpoint position of the worker; and combining the first image M1 and the second image M2 having the luminance adjusted and causing the display device 50 to display the combined image.

[Effects]

As described above, according to the present embodiment, the first image M1 and the second image M2 of the work site are acquired by the first camera 31 and the second camera 32. The luminance L1 of the first image M1 and the luminance L2 of the second image M2 are adjusted based on the viewpoint position of the worker. The luminance combining ratio between the first image M1 and the second image M2 changes in a following manner in accordance with the movement of the viewpoint position of the worker (movement of the head of the worker), in a manner that a visual effect similar to that of the apparent motion is provided to the worker. With this visual effect, the worker feels as if the viewpoint image that is not actually transmitted from the work site to the remote operation facility is being transmitted. Therefore, even if a large-capacity image is not transmitted from the work site to the remote operation facility, the worker can effectively perceive the perspective of the work site with a limited line capacity.

Other Embodiments

Figure 11:
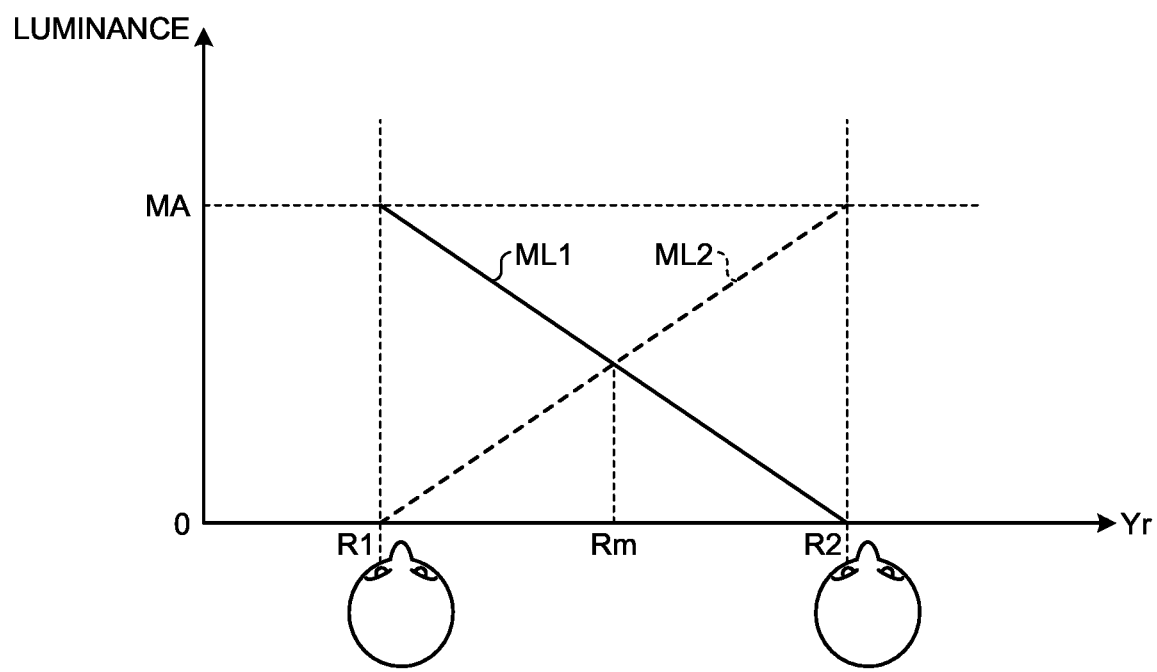
FIG. 11 is a diagram for describing an operation of the luminance adjustment unit according to the present embodiment.

FIG. 11 is a diagram for describing an operation of the luminance adjustment unit 63 according to the present embodiment. As indicated by the line ML1 in FIG. 11, the viewpoint position in the Yr-axis direction may be proportional to the luminance L1 of the first image M1, and as indicated by the line ML2 in FIG. 11, the viewpoint position in the Yr-axis direction may be proportional to the luminance L2 of the second image M2.

Also in the example illustrated in FIG. 11, the luminance adjustment unit 63 adjusts the luminance L1 and the luminance L2 in a manner that [luminance L1:luminance L2=1:0] when the viewpoint position is at the first position R1, and in a manner that [luminance L1:luminance L2=0:1] when the viewpoint position is at the second position R2.

In addition, when the viewpoint position is at the center position Rm, the luminance adjustment unit 63 adjusts the luminance L1 and the luminance L2 in a manner that [luminance L1:luminance L2=1:1].

In addition, when the viewpoint position is at an arbitrary position Ra (not illustrated) between the first position R1 and the second position R2, the luminance adjustment unit 63 adjusts the luminance L1 and the luminance L2 in a manner that [luminance L1:luminance L2=m:n]. The arbitrary position Ra is a position where the distance to the first position R1 is n and the distance to the second position R2 is m.

When the viewpoint position is at the arbitrary position Ra, the display control unit 64 causes the display device 50 to display the first image M1 having the luminance L1 of [prescribed value MA×m %] and the second image M2 having the luminance L2 of [prescribed value MA×n %] in a superimposed manner.

Note that, in the above-described embodiment, the luminance L1 and the luminance L2 are adjusted in a manner that the luminance L2 of the second image M2 becomes zero when the viewpoint position is at the first position R1, and the luminance L1 of the first image M1 becomes zero when the viewpoint position is at the second position R2. The luminance L2 of the second image M2 may be greater than zero when the viewpoint position is at the first position R1, or the luminance L1 of the first image M1 may be greater than zero when the viewpoint position is at the second position R2.

In the above-described embodiment, both the luminance L1 of the first image M1 and the luminance L2 of the second image M2 are adjusted based on the viewpoint position. For example, the luminance L1 of the first image M1 may be maintained at a constant value, and only the luminance L2 of the second image M2 may be adjusted based on the viewpoint position, or the luminance L2 of the second image M2 may be maintained at a constant value, and only the luminance L1 of the first image M1 may be adjusted based on the viewpoint position.

In the above-described embodiment, the imaging device 30 includes the first camera 31 and the second camera 32. The imaging device 30 may include a plurality of three or more arbitrary cameras.

In the above-described embodiment, the imaging device 30 is provided in the excavator 1. The imaging device 30 can be provided at an arbitrary position as long as it can image an object at a work site. For example, the imaging device 30 may be provided in a work machine different from the excavator 1 that is remotely operated, may be provided in a flight object such as a drone, or may be provided in a structure provided at a work site.

In the above-described embodiment, the viewpoint position of the worker is acquired by detecting the position and posture of the head of the worker with the optical head position sensor 41. For example, the position and posture of the head of the worker may be detected by a magnetic head position sensor, or the position of the pupil of the worker may be directly detected by a gaze detection device.

In the above-described embodiment, the work machine 1 is an excavator. The work machine 1 only needs to be a work machine capable of constructing a construction object, and may be an excavation machine capable of excavating a construction object and a carrying machine capable of carrying earth and sand. The work machine 1 may be, for example, a wheel loader, a bulldozer, or a dump truck. More specifically, when the work machine 1 is a vehicle other than a shovel, the position of the camera may be installed at a position where the object or the traveling direction of the vehicle can be imaged. When the work machine 1 is a bulldozer, there is a case where work is performed in the backward movement. Therefore, the installation position of the camera is not limited to the front of the vehicle, and the camera may be provided in the rear of the vehicle.

The invention claimed is:

1. A display system comprising:
    an image acquisition processor unit that acquires each of a first image of a work site imaged by a first imaging device and a second image of the work site imaged by a second imaging device in a first coordinate system;
    a viewpoint position calculation processor unit that calculates a viewpoint position of a worker in a second coordinate system;
    a luminance adjustment processor unit that adjusts luminance of at least one of the first image and the second image based on the viewpoint position; and
    a display control processor unit that combines the first image and the second image having the luminance adjusted and causes a display device to display the combined image,
    wherein the viewpoint position moves between a first position and a second position in the second coordinate system, and
    a relative position between a first position and a second position in the second coordinate system corresponds to a relative position between the first imaging device and the second imaging device in the first coordinate system, and
    the luminance adjustment processor unit performs adjustment in a manner that the luminance of the first image becomes higher than the luminance of the second image when the viewpoint position is at the first position and the luminance of the second image becomes higher than the luminance of the first image when the viewpoint position is at the second position.

2. The display system according to claim 1, wherein the luminance adjustment processor unit performs adjustment in a manner that the luminance of the second image becomes zero when the viewpoint position is at the first position and the luminance of the first image becomes zero when the viewpoint position is at the second position.

3. The display system according to claim 1, wherein the luminance adjustment processor unit performs adjustment in a manner that the luminance of the first image becomes higher as the viewpoint position is closer to the first position and the luminance of the second image becomes higher as the viewpoint position is closer to the second position.

4. The display system according to claim 1, wherein the luminance adjustment processor unit performs adjustment in a manner that the luminance of the first image becomes higher than the luminance of the second image when the viewpoint position is closer to the first position than a center position between the first position and the second position and the luminance of the second image becomes higher than the luminance of the first image when the viewpoint position is closer to the second position than the center position.

5. The display system according to claim 1, wherein
    each of the first imaging device and the second imaging device is provided in a work machine that works at the work site,
    the first imaging device and the second imaging device are disposed in a predetermined direction of the work machine, and
    the first position and the second position are disposed in a prescribed direction corresponding to the predetermined direction.

6. The display system according to claim 1, wherein the viewpoint position of the worker is the relative position of a worker's head.

7. The display system according to claim 1, wherein when the viewpoint position is at a center position between the first position and the second position, the display control processor unit causes the display device to display the first image having the luminance of half of a prescribed value for the first image and the second image having the luminance of half of a prescribed value for the second image in a superimposed manner.

8. The display system according to claim 1, wherein when the viewpoint position is at an arbitrary position between the first position and the second position, the display control processor unit causes the display device to display the first image having the luminance of a percent of a prescribed value for the first image depending on the relative position of the viewpoint to the first position and the second image having the luminance of a percent of a prescribed value for the second image depending on the relative position of the viewpoint to the second position in a superimposed manner.

9. A display method comprising:
    adjusting luminance of at least one of a first image of a work site imaged by a first imaging device and a second image of the work site imaged by a second imaging device based on a position of the first imaging device, a position of the second imaging device, and a viewpoint position of a worker; and
    combining the first image and the second image having the luminance adjusted and causing a display device to display the combined image.

10. A remote operation system, comprising:
    a first imaging device and a second imaging device that are provided in a work machine and image a work site;
    a display device that is disposed outside the work machine;
    a viewpoint position sensor that detects a viewpoint position of a worker outside the work machine; and
    a processing device that is disposed outside the work machine and capable of communicating with the work machine,
    the processing device including
    an image acquisition processor unit that acquires each of a first image imaged by the first imaging device and a second image imaged by the second imaging device,
    a luminance adjustment processor unit that adjusts luminance of at least one of the first image and the second image based on position data of the first imaging device, position data of the second imaging device, and detection data of the viewpoint position sensor, and a display control processor unit that combines the first image and the second image having the luminance adjusted and causes the display device to display the combined image.

* * * * *